United States Patent Office 3,655,744
Patented Apr. 11, 1972

3,655,744
CARBOXYLATION OF METAL ARYLOXIDES
Yutaka Yasuhara, Tatsuo Nogi, and Ikuzo Takahashi,
Shizuoka-ken, Japan, assignors to Toray Industries, Inc.,
Tokyo, Japan
No Drawing. Continuation-in-part of application Ser. No.
658,654, Aug. 7, 1967. This application Feb. 2, 1971,
Ser. No. 112,087
Int. Cl. C07c 65/04
U.S. Cl. 260—521 R                5 Claims

ABSTRACT OF THE DISCLOSURE

A process for preparing a metal salt of an aromatic hydroxycarboxylic acid and a free acid thereof which comprises reacting by heating an aromatic compound selected from a metal phenoxide or derivative thereof and/or metal salt beta-naphthol with carbon monoxide and a carboxylating reagent consisting of a Na, K, Li, Cs, Rb, Ca or Ba salt of carbonic acid and thereafter separating the metal salt of an aromatic hydroxycarboxylic acid.

---

This application is a continuation-in-part of application Ser. No. 658,654, filed Aug. 7, 1967, now abandoned.

The present invention relates to a process for synthesizing a metal salt of an aromatic hydroxycarboxylic acid and a free acid thereof with good yield and excellent reproducibility and selectivity of the reaction; more particularly, the present invention relates to such a process wherein a metal phenoxide or metal salt of β-naphthol is reacted with carbon monoxide and a carboxylating reagent comprising a salt of carbonic acid to produce such metal salt of an aromatic hydrocarboxylic acid or free acid thereof.

In accordance with the present invention the starting material is selected from metal phenoxide and metal salts of β-naphthol, wherein the metal is selected from Na, K, Li, Cs, Rb, Ca and Ba. Such starting phenol materials can be represented as follows:

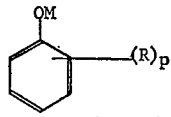

wherein R represents a member selected from the group consisting of a halogen atom, om group, alkoxy group of 1–3 carbon atoms, alkyl group of 1–3 carbon atoms, amino group, aryl group and coom group, p represents a number of 0–4, and M represents a metal selected from Na, K, Li, Cs, Rb, Ca and Ba. The β-naphthol derivative can be represented as follows

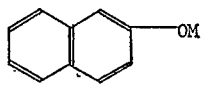

wherein M is as defined above.

The process of the present invention for the synthesis of a metal salt of an aromatic hydroxycarboxylic acid comprises carrying out the reaction using no carbon dioxide ($CO_2$), but, rather, carbon monoxide (CO) in the presence of a metal salt of carbonic acid wherein the metal is selected from the group consisting of Na, K. Li, Cs, Rb, Ca and Ba salts. Accordingly, in such respect the process of the present invention is clearly distinguishable from the herebefore known Kolbe-Schmitt reaction.

The aromatic hydroxycarboxylic acid or metal salt thereof, optionally substituted, obtained by the process of the present invention is useful as an intermediate in the synthesis of dyestuffs, synthesis of antiseptics and synthesis of germicides and as a compound in the synthesis of polymers of synthetic fibers and plastics.

Prior to the development of the present invention, various processes for synthesizing aromatic hydroxycarboxylic acids have been proposed. As a representative proposal, the Kolbe-Schmitt reaction (A. S. Lindsey & H. Jeskey, Chem. Rev., 57, 583 (1957) is one wherein alkali metal salts of phenols and naphthols are carboxylated with carbon dioxide ($CO_2$).

This method provides good results in the sythesis of certain types of aromatic hydroxycarboxylic acids, such as for example, salicyclic acid. However, in the case of the sythesis of other aromatic hydrocarboxylic acids, for instance, p-hydroxybenzoic acid, the Kolbe-Schmitt method exhibits only a low yield, about 50% of the phenol reaction remaining unreacted. Thus, such method is considerably limited in its application. Also, with respect to reproducibility and selectivity of the reaction, the Kolbe-Schmitt method has various disadvantages yet to be solved.

As a result of research conducted in an attempt to provide a superior process for the sythesis of aromatic hydroxycarboxylic acid, it was discovered that when potassium phenoxide was treated in an autoclave with potassium carbonate in carbon monoxide under pressure at 240° C. for 3.5 hours, p-hydroxybenzoic acid in the form of its dipotassium salt was obtained at a high yield almost quantitatively. This fact was disclosed under the title of "A novel sythesis of p-hydroxybenzoic acid" in Chemistry and Industry (Feb. 11, 1967, page 229 (hereinafter referred to as Chem. & Ind.

Such process may be expressed as follows:

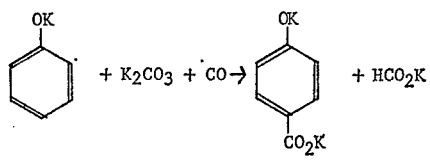

Further, in accordance with the known Kolbe-Schmitt reaction, when instead of the potassium salt of phenol, a sodium salt is used and instead of CO, $CO_2$ is used, the principal product is a salt of salicyclic acid and no substantial amount of p-hydroxybenzoic acid is obtained. However, it has been discovered that in the process of the present invention for the synthesis of aromatic hydroxycarboxylic acids, even when a sodium salt of phenol is used instead of the potassium salt, a salt of p-hydroxybenzoic acid is obtained as the principal product. Further, it has been discovered that from a sodium salt of phenol, sodium carbonate and carbon monoxide also a salt of p-hydroxybenzoic acid is obtained as a main product, although at a slow rate.

Also it has been found that in the reaction described in Chem. & Ind. and shown by the above reaction formula, in an experiment wherein a carbon of $K_2CO_3$, labeled by a radioactive isotope (C–14), is used as a tracer of C* carbon in the product

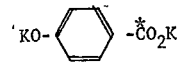

is derived from the carbon of the potassium carbonate and the carbon of potassium formate is derived from the carbon of the carbon monoxide.

This fact was described at the 20th meeting of the Japan Chemical Society on Apr. 2, 1967, the abstract of which was printed in abstracts of papers and distributed on Mar. 30, 1967.

Upon continued research and as a result of examining the possible utilization of an aromatic compound and a metal salt thereof in a novel reaction using carbon monoxide, it was discovered that the process of the present invention is applicable to a broad range of derivatives of phenol and naphthols and as the metal salt of carbonic acid metals of Groups Ia and IIa of the Periodic Table can be utilized; specifically, Na, K, Li, Cs, Rb, Ca and Ba.

Accordingly, a principal object of the present invention is to provide a process for preparing a metal salt of an aromatic hydroxycarboxylic acid and a free acid thereof by a process having advantages such as excellent yield, high reproducibility of reaction, high selectivity of reaction and avoidance of side-reactions.

It is a further object of the present invention to provide such a process for the production of a metal salt aromatic hydroxycarboxylic acid and the free acid thereof by reacting a Na, K, Li, Cs, Rb, Ca or Ba phenoxide or salt of β-naphthol with carbon monoxide and as a carboxylating reagent a Na, K, Li, Cs, Rb, Ca or Ba salt of carbonic acid.

Further objects and advantages of the present invention will become apparent from the following description thereof.

A metal salt of the aromatic compound used in the present invention is phenol, β-naphthol or derivatives thereof. Such aromatic compound includes, for instance, Li, Na, K, Rb, Cs, Ca, and Ba salts of phenol; Na and K salts of o-cresol; Na, K and Cs salts of m-cresol; K and Rb salts of p-cresol; Li, Na and K salts of 3,5 and 2,3-dimethylphenol; and Na and K salts of o- and p-chlorophenol; K salt of o-bromophenol; di-potassium salts of salicyclic acid; Na and K salts of catechol and resorcinol; Na and K salts of hydroquinone; Na and K salts of pyrogalol; Na and K salts of hydroquinone monomethylether; Na and K salts of m-aminophenol; K salt of 4,4'-dihydroxydiphenyl; and Na and K salts of β-naphthol, etc.

The carboxylating reagent used in the process of the present invention is a metal salt selected from the group consisting of the Na, K, Li, Cs, Rb, Ca and Ba salt of carbonic acid. As such metal salts, the Na and K salts are preferred.

The ratio of the aromatic compound to the carboxylating reagent used in the present invention can vary within a broad limit. However, it is preferred to utilize such components in a ratio of about 0.1–20 moles of the carboxylating reagent per 1 mole of the aromatic compound. The particular ratio for any specific system can be easily determined depending on the combination of aromatic compound and carboxylating reagent as well as the reaction conditions.

In accordance with the present invention, even under atmospheric pressure, carbon monoxide is useful in the reaction; however, when carbon monoxide exists in the reaction system under pressure, the reaction rate increases to a preferable extent. A preferable pressure is 5–150 kg./cm.$^2$ (at room temperature). A pressure exceeding 150 kg./cm.$^2$ is suitable; however, because pressure resistance of the reactor must be increased in such case, there is no necessity to adopt a particularly excessive pressure. The carbon monoxide which is used may be crude carbon monoxide containing gases which do not hinder the reaction. Such gases which do not hinder the reaction include, for example, hydrogen, nitrogen, methane, argon and minor amounts of air and carbon dioxide. For instance, a somewhat purified producer gas and water gas may be used with excellent success.

The ratio of carbon monoxide to the metal salt of carbonic acid is preferably within the range of 0.1–20 moles of carbon monoxide to 1 mole of the metal salt. When carbon monoxide is repeatedly used or the reaction is carried out in a stream of carbon monoxide, an amount exceeding the above range can be used, and in such case excess carbon monoxide is taken out unreacted.

It is preferable to carry out the reaction in the substantial absence of moisture by removing the moisture in the reaction system as much as possible. However, the existence of a minor amount of moisture is acceptable and there is no necessity to add a moisture removing step.

It is often unnecessary to charge the metal salt of the aromatic compound to the reaction system in the form of a preformed salt since it is possible to charge phenol, for example, and caustic potash, for example, separately in the reaction system to form a salt in the reaction system and dehydrate and dry such salt when necessary to carry out the reaction.

The reaction of the present invention may be carried out by heating a reactor therein containing the aromatic compound and the carboxylating reagent consisting of carbon monoxide and metal salt of carbonic acid. The reaction temperature varies within broad limits depending upon the reactants, reaction medium, presence or absence of the reaction medium and the final product desired; however, normally a temperature within the range of about 100°–500° C. is satisfactory. Usually the reaction is carried at a temperature of 120°–400° C. Preferably, the reaction temperature is 150°–360° C. The reaction period is normally 1–40 hours.

For instance, when 1 mole of a potassium salt of phenol is used as the starting aromatic compound and 0.5 mole of potassium carbonate and a sufficient amount of carbon monoxide are used as the carboxylating reagent in carrying out the reaction at a reaction temperature of 200°–250° C., dipotassium p-hydroxybenzoate and potassium formate are obtained in amounts of about 0.5 mole, respectively, and further when the reaction is continued at 350° C., about 0.65 mole of a potassium salt of p-hydroxybenzoic acid and about 0.08 mole of a potassium salt of salicyclic acid are obtained.

With respect to both the aromatic compound and the carboxylating reagent, the use of salts of metals of Group Ia rather than Group IIa of the Periodic Table provides greater reactivity, and of the same metals of Group Ia, a metal having less electronegativity will generally exhibit greater reactivity.

In carrying out the reaction of the present invention, a reaction medium may be used when desired. In many cases the use of such a reaction medium is preferred.

Use of a proper medium is useful to avoid local overheating of the reactants and shortage of stirring of the reactants, and as a result in many cases, an advantageous result, such as reducing the formation of tar-like products and advancing the reaction rate are obtained. Further, use of a proper medium is operationally convenient in that sending in and taking out of solid material and product into and from the reaction zone can be carried out in a slurry state. Any medium which is liquid under the reaction conditions and will not lose its function as a medium by contact with the reactants and heating may be used. Also reactants which are liquid under the reaction conditions can concurrently act as such media.

Organic liquids such as aromatic hydrocarbons, aliphatic hydrocarbons, ethers, and ketones are advantageously used as the reaction medium. Specific examples include, for example, aromatic hydrocarbons such as benzene, toluene, xylenes, naphthalene, diphenyl and diphenyl methane; aliphatic hydrocarbons such as n-hexane, n-nonane, isooctane, cyclohexane and methyl cyclohexane; and hydrocarbons such as a mixture of petroleum ether, kerosene and petroleum naphtha; ethers such as diphenyl ether, anisole, dioxane and dicyclohexyl ether; and ketones such as acetone, methylethyl ketone, cyclohexanone, benzophenone and acetophenone; and an alkali metal salt of a fatty acid such as sodium formate and potassium formate.

The reaction may be carried out without using a reaction medium and the reaction medium is generally used in an amount of 0–20 times the total weight of the reactants.

Any reactor that can withstand the reaction pressure and temperature can be used and usually a pressure-resistant reactor is adopted.

The reaction may be carried out either batchwise or continuously. In order to sufficiently contact the reactants it is usually preferable to carry out the reaction with stirring. Stirring may be carried out by using a stirrer or by moving the reactor per se to impart stirring to the contents.

According to the process of the present invention, a metal salt of an aromatic hydroxycarboxylic acid, optionally substituted, and corresponding to the aromatic reactant is produced. The metal salt of an aromatic hydroxycarboxylic acid which is obtained is relatively high in purity and it is usable in the form of a salt per se or usable after purifying by simple means such as discoloration by active carbon when desired. By separation in accordance with the conventional method for instance, by adding an organic or inorganic acid such as, for example, formic acid, acetic acid, carbonic acid (carbon dioxide), hydrochloric acid (hydrogen chloride), sulfuric acid and sulfurous acid (sulfur dioxide), the metal salt may be easily converted to the corresponding free hydroxycarboxylic acid.

From the extracted ether layer, ether is distilled off. Further hydrochloric acid is added to the hydrochloric acid aqueous solution layer to adjust the pH to 1.0 and the solution is again extracted with ether. The ether layer is separated and taken out and by distilling off ether, salicylic acid and p-hydroxybenzoic acid are produced. The crude product is dissolved in hot water, treated with active carbon and thereafter cooled to produce 0.65 gram of purified p-hydroxybenzoic acid (M.P. 211–213° C. and 1.25 grams salicylic acid).

EXAMPLES 2–4

By using the process of Example 1, except varying the aromatic compound, carboxylating reagent, reaction temperature and/or reaction period, the results shown in Table 1 below are obtained.

TABLE 1

| Example No. | Material aromatic compound (using amt: g.) | Metal salt (g.) | CO (kg./cm.$^2$ gauge at room temp.) | Reaction Medium (g.) | Reaction Temp. (° C.) | Reaction Period (hr.) | Obtained aromatic hydroxycarboxylic acid (g.) |
|---|---|---|---|---|---|---|---|
| 2 | K-phenoxide (6.6) | $K_2CO_3$ (6.9) | 80 | K-formate (4.2)[1] | 170–180 | 5.5 | Salicylic acid (0.2), p-hydroxybenzoic acid (2.2), 4-hydroxyisophthalic acid (0.1). |
| 3 | do | $K_2CO_3$ (6.9) | 85 | | 235–205 | 6 | p-Hydroxybenzoic acid (6.8), (2.0 g. of formic acid). |
| 4 | K-phenoxide (20) | $K_2CO_3$ (21) | 50 | | 240 | 5.5 | p-Hydroxybenzoic acid (17.3). |

[1] Reaction solvent.

The present invention will now be illustrated by reference to the following examples, which Examples are presented for purposes of illustration only and the present invention is in no way to be deemed limited thereto.

EXAMPLES 5–20

Following the procedure of Example 1 except changing various conditions, the results shown in Table 2 are obtained.

TABLE 2

| Example No. | Material aromatic compound (using amt: g.) | Metal salt (g.) | CO (kg./cm.$^2$ gauge at room temp.) | Reaction Medium (g.) | Reaction Temp. (° C.) | Reaction Period (hr.) | Obtained aromatic hydroxycarboxylic acid (g.) |
|---|---|---|---|---|---|---|---|
| 5 | K-phenoxide (6.6) | $K_2CO_3$ (3.5) | 60 | | 350 | 6.5 | p-Hydroxybenzoic acid (3.4). |
| 6 | do | $K_2CO_3$ (3.5) | 60 | | 2.5 hours at 250° C. / 3.0 hours at 350° C. | | Salicylic acid (0.5), p-hydroxybenzoic acid (4.3). |
| 7 | do | $Na_2CO_3$ (5.6) | 95 | | 240 | 6.5 | Salicylic acid (0.33), NP-hydroxybenzoic acid (1.17). |
| 8 | Na-phenoxide (5.8) | $K_2CO_3$ (7.3) | 100 | | 240 | 6.5 | p-Hydroxybenzoic acid (5.9). |
| 9 | do | $Na_2CO_3$ (5.8) | 80 | Acetone[1] | 260 | 5.5 | Crude p-hydroxybenzoic acid (0.5). |
| 10 | do | $Na_2CO_3$ (5.8) | 70 | K-formate (1.05) | 260 | 6.3 | Salicylic acid (0.3), p-hydroxybenzoic acid (1.6). |
| 11 | do | $Na_2CO_3$ (5.8) | 60 | Na-formate (3.4) | 260–265 | 22 | p-Hydroxybenzoic acid (6.4), (4.1 g. of formic acid recovered). |
| 12 | K-phenoxide (6.61) | $BaCO_3$ (9.88) | 60 | | 240–244 | 5.75 | Salicylic acid (0.86), p-hydroxybenzoic acid (0.19). |
| 13 | do | $CaCO_3$ (5.00) | 60 | | 240–244 | 5.75 | Salicylic acid (0.38), p-hydroxybenzoic acid (0.38). |
| 14 | do | $Li_2CO_3$ (3.69) | 60 | | 240–244 | 5.75 | Crude salicylic acid (1.16). |
| 15 | Li-phenoxide (5.01) | $K_2CO_3$ (6.91) | 55 | | 240–246 | 6.5 | Salicylic acid (0.80), p-hydroxybenzoic acid (0.20). |
| 16 | Ba-diphenoxide (8.09) | $K_2CO_3$ (6.91) | 55 | | 240–246 | 6.5 | Salicylic acid (0.64), p-hydroxybenzoic acid (2.93). |
| 17 | Ca-diphenoxide (5.66) | $K_2CO_3$ (6.91) | 55 | | 240–246 | 6.5 | Salicylic acid (1.53), p-hydroxybenzoic acid (2.20). |
| 18 | K-phenoxide (6.6) | $Rb_2CO_3$ (11.5) | 50 | | 200 | 5.0 | Crude p-hydroxybenzoic acid (5.8). |
| 19 | Cs-phenoxide (11.3) | $Cs_2CO_3$ (16.3) | 50 | | 200 | 5.0 | Crude p-hydroxybenzoic acid (6.2). |
| 20 | Na-phenoxide (4.5) | $Na_2CO_3$ (4.1) | 80 | Diphenyl ether[2] | 260–265 | 6.5 | Crude p-hydroxybenzoic acid (0.1). |

[1] 1 ml.  [2] 5.9 ml.

EXAMPLE 1

A glass ampoule having a thin vent is charged with 6.6 grams of potassium phenoxide and 6.9 grams of potassium carbonate in 0.1 ml. acetone, the ampoule being placed in a 100 ml. stainless steel autoclave. Inside the autoclave, in a nitrogen atmosphere (5–10 mm. Hg), the ampoule is dried at 140° C., for 6 hours, and thereafter the contents are reacted at 130° C.–140° C., with shaking for 41 hours under a carbon monoxide pressure of 60 kg./cm.$^2$ gauge (at room temperature).

After completion of the reaction the gases inside the autoclave are analyzed by gas chromatography to confirm the formation of small amounts of $CO_2$, $H_2$ and $CH_4$. The reaction product is dissolved in about 3 times by volume of heated water, the pH of the resulting solution is adjusted to 9.0 using 6 N hydrochloric acid, and thereafter the solution is extracted with ethyl ether.

EXAMPLE 21

A 200 ml. stainless autoclave is charged with 20.0 of potassium phenoxide obtained by reacting phenol and caustic potash in an aqueous solution, concentrating, drying and adjusting the reaction product, 21.0 g. of potassium carbonate and 70.0 g. of diphenylether as a reaction medium, to which carbon monoxide is passed under a pressure of 50 kg./cm.$^2$ at room temperature and the contents are reacted at 240° C. for 4 hours with shaking. After completion of the reaction, about 100 ml. of water are added to the reaction mixture, the aqueous solution is washed with ether thereby removing the solvent and neutral substance, thereafter the aqueous solution is neutralized with 1 N hydrochloric acid until the pH thereof becomes 9.0, and further washed with ether to extract a neutral substance. After extraction, the aqueous solution is treated with active carbon and sufficiently separated with 12 N hydrochloric acid. The crystals produced are filtered, washed and dried thereby producing 17.5 g. of p-hydroxybenzoic acid.

EXAMPLES 22-32

Following the procedure of Example 21 reactions are carried out as shown in Table 3.

TABLE 3

| Example No. | Material aromatic compound (using amt: g.) | Carboxylating reagent | | Solvent (additive) | Reaction temp. (° C.) | Reaction period (hr.) | Obtained aromatic hydroxycarboxylic acid (g.) |
|---|---|---|---|---|---|---|---|
| | | Metal salt (g.) | CO (kg/cm.² gauge at room temp.) | | | | |
| 22 | K-phenoxide (4.7) | $K_2CO_3$ (6.9) | 100 | | 100 | 5.0 | Salicylic acid (0.3), p-hydroxybenzoic acid (0.2). |
| 23 | K-phenoxide (4.7) | $K_2CO_3$ (27.6) | 100 | | 250 | 5.0 | Salicylic acid (1.7), p-hydroxybenzoic acid (1.3), 4-hydroxyisophthalic acid (3.5). |
| 24 | o-Cresol-K salt (7.31) | $K_2CO_3$ (6.91) | 89 | | 235-245 | 6.5 | 4-hydroxy-3-methylbenzoic acid (1.2). |
| 25 | m-Cresol-K salt (7.31) | $K_2CO_3$ (6.91) | 87 | | 235-245 | 6.5 | Mixture (1.4) of 2-hydroxy-4-methylbenzoic acid and 4-hydroxy-2-methylbenzoic acid. |
| 26 | p-Cresol-K salt (7.31) | $K_2CO_3$ (6.91) | 90 | | 235-245 | 6.5 | 2-hydroxy-5-methylbenzoic acid (2.3). |
| 27 | o-Chlorophenol-K salt (33.3) | $K_2CO_3$ (30.4) | 75 | | 240-250 | 4.0 | 3-chloro-4-hydroxybenzoic acid (6.0). |
| 28 | o-Chlorophenol-K salt (8.34) | $K_2CO_3$ (6.9) | 60 | | 230-240 | 11.0 | 3-chloro-4-hydroxybenzoic acid (3.4). |
| 29 | p-Chlorophenol-K salt (5.0) | $K_2CO_3$ (4.15) | 55 | | 195-202 | 6.5 | 4-chloro-4-hydroxybenzoic acid (0.95). |
| 30 | Dipotassium salicylate (5.4) | $K_2CO_3$ (3.5) | 80 | | 170-180 | 5.0 | 4-hydroxyisophthalic acid (0.1), Salicylic acid (recovered) (3.2). |
| 31 | Dipotassium salicylate (10.7) | $K_2CO_3$ (6.9) | 60 | $H \cdot CO_2K$ 2.1 | 170 | 21.0 | 4-hydroxyisophthalic acid (91.4), Salicylic acid (recovered) (3.5), p-hydroxybenzoic acid (rearranged) (1.7). |
| 32 | β-Naphthol-K salt (9.1) | $K_2CO_3$ (6.9) | 73 | | 240 | 6.0 | 3-hydroxy-2-naphthoic acid (1.6). |

While the present invention has been described primarily with respect to the foregoing exemplification, it should be understood that the present invention is in no way to be deemed as limited thereto, but rather must be construed as broadly as all or any equivalents thereof.

What is claimed is:

1. A process for preparing a metal salt of an aromatic hydroxycarboxylic acid and a free acid thereof which comprises reacting an aromatic compound selected from the group consisting of
(i) a phenol derivative of the formula:

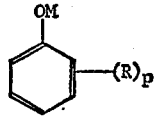

wherein R is a member selected from the group consisting of a halogen atom, —OM group, —COOM group, alkyl group having 1-3 carbon atoms, alkoxy group having 1-3 carbon atoms, amino group and aryl group; p represents a number of 0-4; and M represents an atom selected from the group consisting of Na, K, Li, Cs, Rb, Ca and Ba,
(ii) a β-naphthol derivative of the formula:

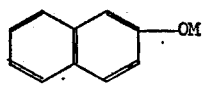

wherein M is an defined above with carbon monoxide and carboxylating reagent comprising at least one metal salt of carbonic acid, said metal being selected from Na, K, Li, Cs, Rb, Ca, and Ba; and separating the metal salt of an aromatic hydroxycarboxylic acid.

2. The process of claim 1 wherein said reaction is carried out at a temperature of 100°–500° C., and under a pressure of 5–150 kg./cm.² of carbon monoxide.

3. The process of claim 1 wherein said carboxylating reagent is used at a ratio of 0.1–20 moles based on 1 mol of said aromatic compound.

4. The process of claim 1 wherein said metal salt of an aromatic hydroxycarboxylic acid is separated with an acid to produce the corresponding free hydroxycarboxylic acid.

5. The process of claim 1 wherein said phenol derivative is represented by the formula:

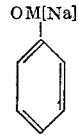

wherein M represents an atom selected from the group consisting of Na and K and said carboxylating reagent is selected from the Na and K salts of carbonic acid.

References Cited

Lindsey et al.; Chem. Rev., 59, 583–585 (1957).

LORRAINE A. WEINBERGER, Primary Examiner

J. F. TERAPANE, Assistant Examiner

U.S. Cl. X.R.

260—519, 520, 521 A